Dec. 17, 1940.    E. F. W. ALEXANDERSON    2,225,328
ELECTRIC POWER CONVERTING APPARATUS
Filed May 26, 1939    2 Sheets-Sheet 1
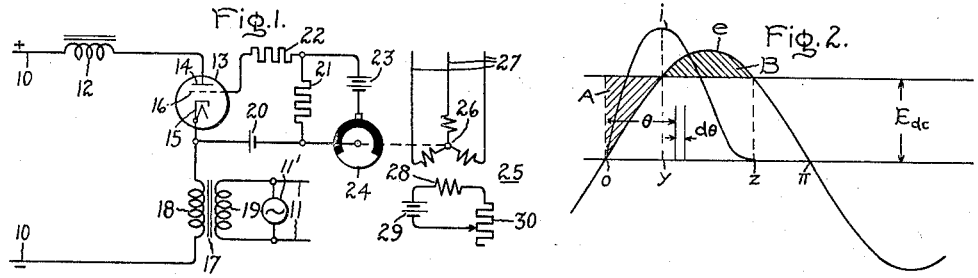
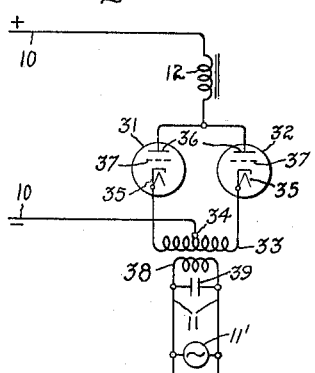
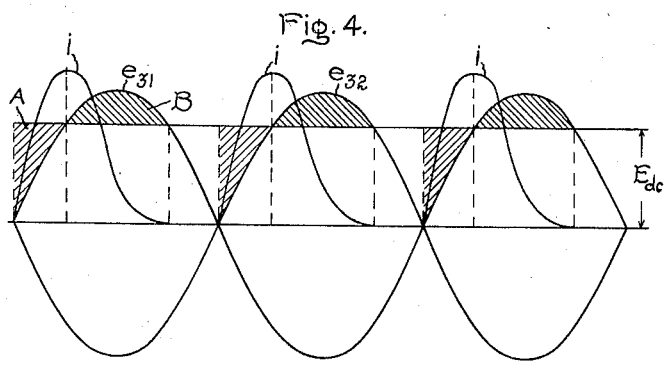
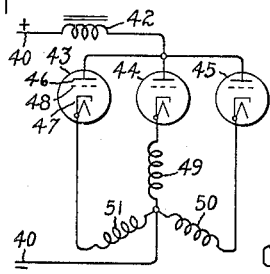
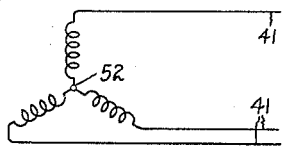
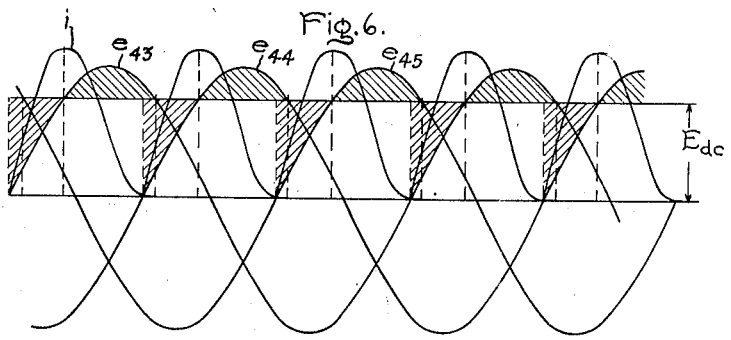
Inventor:
Ernst F. W. Alexanderson,
by Harry E. Dunham
His Attorney.

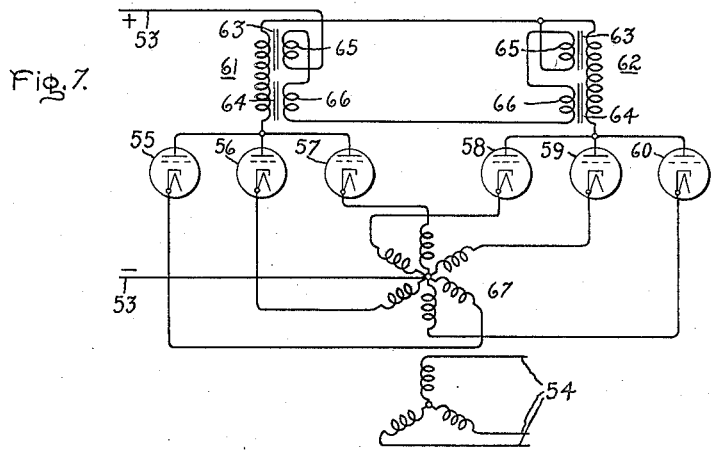
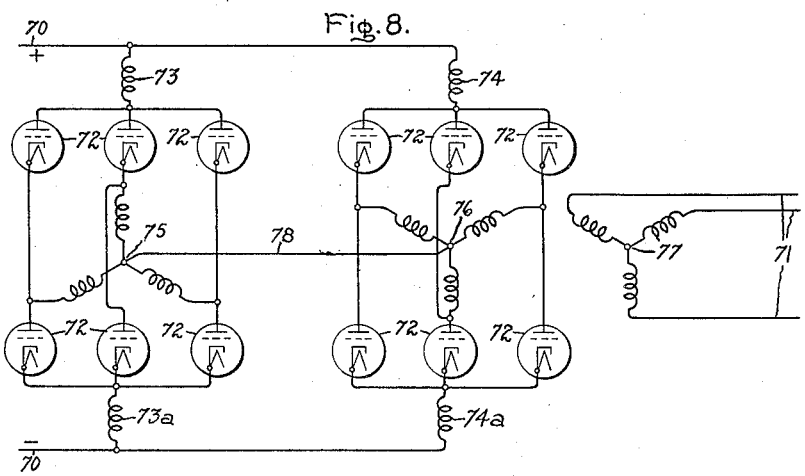
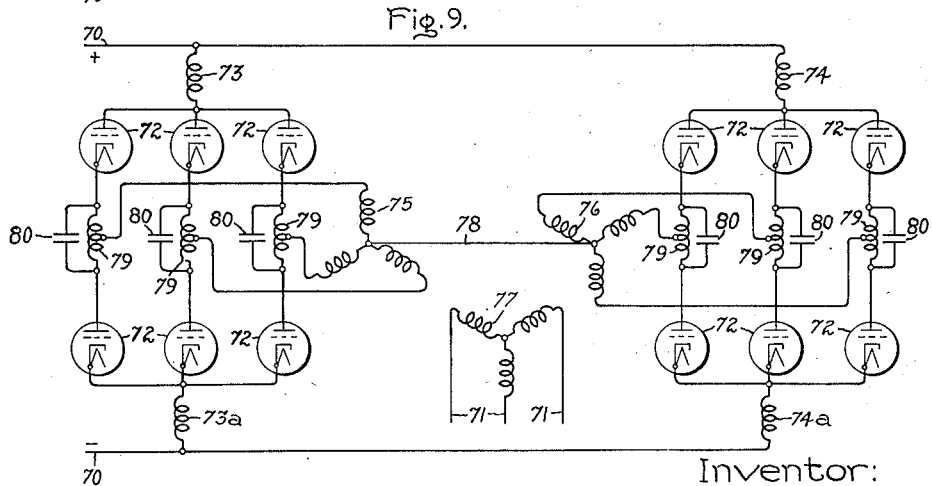

Patented Dec. 17, 1940

2,225,328

UNITED STATES PATENT OFFICE 2,225,328

ELECTRIC POWER CONVERTING APPARATUS

Ernst F. W. Alexanderson, Schenectady, N. Y., assignor to General Electric Company, a corporation of New York Application May 26, 1939, Serial No. 275,865

11 Claims. (Cl. 175—363)

My invention relates to electric power converting apparatus, and more particularly to such apparatus utilizing electric discharge valves for transmitting energy between direct and alternating current circuits.

It is well known that power may be transmitted between direct and alternating current circuits through apparatus including electric discharge devices where the discharge devices are of the type in which the conduction of current is effected by means of both electrons and positive ions. In such apparatus, a control electrode or grid is capable of preventing the starting of current through the device, but in the form of valves commonly used commercially the grid circuit is not capable of stopping the discharge after it has started. In the operation of such apparatus control of the current flowing through the electric discharge device is regained only when the anode potential relative to the cathode potential is reduced substantially to zero. Hence if an alternating potential is applied between the cathode and anode of the electric discharge valve, control of the current flowing through the valve is secured at the end of each half cycle. In the case of electric discharge valve inverters on the other hand, where a unidirectional potential is applied between the anode and cathode of the electric valves, some means has been necessary heretofore for neutralizing the effect of this potential if control of the current flowing through the discharge valve is to be regained after the current has once started to flow through the valve.

Thus in transforming direct to alternating current by means of electric discharge devices of the type described it has been considered essential that means be provided for commutating the load current, i. e., shifting it from one discharge path to another. Hence it has been usual in inverter circuits to use more than one electric discharge valve or discharge path because the stopping of the current flow in one discharge valve or path depended upon the firing of another valve or path, that is, forced changeover of the current from one valve or path to the other or commutation took place. This however, is obviated in my new type of inverter for converting unidirectional current into alternating current in which the current through the electric valve starts at the beginning of the half cycle due to the firing of the grid but extinguishes itself before the end of the half cycle without any reference to grid action or without depending upon commutation. In this inverter current ceases to flow in one electric discharge valve regardless of what takes place in any other electric valve and hence in principle it is possible to have an inverter using only a single electric discharge valve wherein the arc extinguishes itself at the end of a definite time. Inverters using a single electric discharge valve have been suggested heretofore and have been described and claimed, for example, in U. S. Letters Patent 1,898,827, issued February 21, 1933, to Charles S. Franklin and Denzil A. Cutler, and U. S. Letters Patent 1,980,899, issued November 13, 1934, to Burnice D. Bedford. The operation of these arrangements, however, depends upon the charging and discharging of a capacitor in an oscillatory circuit. The inverter in accordance with my invention dispenses with the use of a capacitor in an oscillatory circuit for causing the satisfactory operation of an inverter utilizing a single electric discharge valve.

Heretofore, difficulties have been encountered when electric valves were used in inverter circuits in that when forced commutation took place causing extinguishment of the arc discharge a large number of positive ions were left in the space between the anode and cathode and during the period of deionization, especially in high voltage electric valves, severe positive ion bombardment of the anodes took place. It would be desirable to eliminate this objectionable feature by operating the electric valves in such a way that the electric discharge current in the arc approaches zero with a minimum rate of change thus allowing the positive ions associated with the ion plasma within the electric valves sufficient time to diffuse without establishing high voltage gradients. It has already been suggested to use saturable reactors connected in series with the electric discharge valves so as to afford a high impedance at low current values in forced commutation inverters thereby tending to cause the current to approach zero with a minimum rate of change. Such an arrangement is disclosed and claimed in U. S. Letters Patent 2,126,603, issued August 9, 1938, to Burnice D. Bedford. However, in accordance with the principles of my invention I do not depend upon the decrease in saturation of a reactor to effect an increase in impedance and thereby a decrease in current prior to forced commutation, but on the other hand I utilize a reactor of such a value relative to the direct current and alternating current voltages in the direct current circuit as to effect extinction of the arc discharge at the desired time automatically.

It is an object of my invention to overcome the disadvantages above noted in connection with electric valve converting apparatus for transmitting power between direct and alternating current circuits.

It is another object of my invention to provide a new and improved electric valve converting apparatus.

It is a further object of my invention to provide a new and improved inverter wherein freedom from bombardment of the anodes of the electric valves is obtained as well as smoother wave shape while at the same time retaining reliability of operation.

It is a still further object of my invention to provide a new and improved electric valve converting apparatus for converting direct current into alternating current.

In accordance with the illustrated embodiment of my invention I provide a new type of electric valve converting apparatus for converting direct current to alternating current wherein a single electric discharge valve may be used. The current flowing through the electric discharge valve is periodically extinguished by virtue of the specific relationships between the voltage of the direct current circuit and the counter electromotive force of the alternating current circuit and the value of the reactance in the direct current circuit. The wave shape of the current flowing through the electric discharge valve becomes tangent to the zero line when approaching current zero thus making for ideal operating conditions of the electric discharge valve and substantially eliminating positive ion bombardment of the anode of the electric discharge valve.

My invention will be better understood from the following description when considered in connection with the accompanying drawings and its scope will be pointed out in the appended claims. Referring to the drawings, Fig. 1 is a diagrammatic representation of a circuit organization employing my single electric discharge valve type of inverter, while Fig. 2 represents certain operating characteristics of the apparatus illustrated in Fig. 1 to aid in the understanding of my invention; Fig. 3 diagrammatically represents a modification of the arrangement disclosed in Fig. 1 while Fig. 4 illustrates certain operating characteristics thereof; Fig. 5 discloses a three-phase inverter circuit embodying my invention, while Fig. 6 represents certain operating characteristics of the arrangement disclosed in Fig. 5; Fig. 7 illustrates a six-phase inverter circuit embodying my invention, while Figs. 8 and 9 illustrate modifications of the arrangement disclosed in Fig. 7.

Referring now to Fig. 1 of the drawings, there is illustrated an arrangement for transmitting energy from a direct current supply circuit 10 to an alternating current load circuit 11 including a source of counter electromotive force symbolically illustrated at 11'. It will be understood that if load circuit 11 is energized from an independent source of alternating current then the source of counter electromotive force 11' may be dispensed with. This arrangement includes an inductance 12 connected in the direct current circuit in series with an electric discharge valve 13. The inductance 12 has a definite value of reactance relative to the voltage of the direct current source and the current flowing through electric discharge valve 13 as will be pointed out hereinafter.

I have illustrated electric discharge valve 13 as provided with an anode 14, a cathode 15 and a control electrode or grid 16. A transformer 17 has its primary winding 18 connected in series with the electric discharge valve 13 while its secondary winding 19 is connected in the load circuit 11. In order to control the initiation of current through electric discharge valve 13 and also to prevent current from flowing once the valve has become nonconductive I provide an excitation circuit for control electrode 16 which may be any of the well known arrangements familiar to those skilled in the art. I have illustrated one type of excitation circuit which includes a negative bias battery 20 connected in the grid to cathode circuit of electric discharge valve 13 in series with resistances 21 and 22. In order periodically to energize control electrode 16 with positive potential so that an arc discharge may be initiated through valve 13 I provide battery 23 connected in series with a distributor 24 so as periodically to overcome the negative bias of battery 20. Distributor 24 may be driven by any suitable means and I have illustrated a synchronous motor 25 having an armature winding 26 energized from a suitable source of alternating current 27 having a frequency equal to that of load circuit 11 or the motor 25 may be driven from circuit 11. A field winding 28 for synchronous motor 25 is illustrated as being energized from a direct current source comprising battery 29 connected in series with variable resistor 30 if a separate field excitation is required. The electric discharge valve 13 thus acts as a valve which admits current to the alternating current circuit 11 every other half cycle of the voltage appearing across load circuit 11.

In explaining the theory of my single discharge valve type of inverter, reference may be had to Fig. 2 wherein $e$ indicates the counter electromotive force of the inverter, $E_{dc}$ indicates the direct current voltage of the source 10 and $i$ indicates the periodic current flowing through electric discharge valve 13. Assume, for example, that distributor 24 which is driven at synchronous speed by motor 25 energized from a source of alternating current having a frequency equal to that of the counter electromotive force $e$ illustrated in Fig. 2, is in a position so that positive potential from battery 23 is impressed upon control electrode 16 just at the instant that the counter electromotive force of the inverter is equal to zero and tending to increase in the positive direction as illustrated by the point O in Fig. 2. At that moment the full electromotive force of the direct current source, namely $E_{dc}$, is active to build up a current in the circuit including inductance 12 and the electric discharge valve 13 and the rate at which this current builds up depends upon the reactance of this circuit. This building up process of the current $i$ continues until the counter electromotive force of the inverter becomes equal to the voltage of the direct current source $E_{dc}$ which time is illustrated by the angle $y$ in Fig. 2. Following this there occurs a period during which the counter electromotive force $e$ is greater than the direct current potential $E_{dc}$ and during this period the resultant electromotive force $(E_{dc}-e)$ tends to reduce the current $i$, the rate of change of current being at every moment determined by the resultant electromotive force and the reactance of the circuit. If now the counter electromotive force is adjusted so that the two shaded areas A and B in Fig. 2 between the alternating and direct current electromotive force lines are exactly equal the current will be forced down to zero at the moment when these lines cross each other the second time, as indicated by the angle $z$ in Fig. 2. The area A represents the energy stored in the reactance of the circuit during the period when the direct current electromotive force exceeds the counter electromotive force of the inverter, while the area B represents the dissipation of this stored energy during the period when the counter electromotive force of the inverter is greater than the electromotive force of the direct current circuit. If at the time represented by the angle $z$ distributor 24 has been rotated to a position so that the brush is on the insulated segment as illustrated in Fig. 1, the negative bias potential of battery 20 will be impressed upon control electrode 16 and hence the current through electric discharge valve 13 will not only cease but will be prevented from starting again by virtue of the negatively excited control electrode. The shape of the wave of current $i$ which has been flowing through the circuit including the inductance 12 and electric discharge valve 13 shown in Fig. 2 is tangent to the zero line at the time of extinction of the current through valve 13 which is an ideal condition for the operation of high voltage electric discharge valve since positive ion bombardment of the anode is then practically eliminated. If the second area B in Fig. 2 should be slightly larger than the first area A the result would be to force the current $i$ down to zero and extinguish the arc discharge through electric valve 13, at a time slightly before $z$ in Fig. 2, whereas if area B should be smaller than A the current wave $i$ would approach zero but would rise again as the counter electromotive force $e$ became less than the electromotive force $E_{dc}$ of the direct current circuit. In this latter case extinction of the current $i$ flowing through discharge valve 13 would not take place. It is evident, therefore, that the factors combining to bring about extinction of the arc discharge must be so adjusted that extinction takes place slightly before or at the point indicated by the angle $z$ shown in Fig. 2.

In order better to explain the theory of my new type of inverter, the specific relationships between the various factors cooperating to bring about extinction of the arc discharge through electric valve 13 will be developed by a geometrical analysis of Fig. 2 for the critical condition illustrated therein when the area A which represents the period when energy is accumulated in inductance 12 is exactly equal to the area B representing the period when energy is dissipated from inductance 12. It will be assumed for the purpose of this analysis that the counter electromotive force $e$ has a purely sinusoidal wave form and is represented by the equation:

$$e = E \sin \omega t \quad (1)$$

or
$$e = E \sin \theta \quad (1a)$$

where $\omega$ is the angular velocity in radians per second, $t$ is time in seconds, $\theta$ represents the angle in radians and $E$ is the amplitude of the counter electromotive force wave.

Also
$$A = B \quad (2)$$

Then from Fig. 2

$$A = E_{dc} y - \int_0^y E \sin \theta \, d\theta \quad (3)$$

and $$B = 2 \int_y^{\frac{\pi}{2}} E \sin \theta \, d\theta - 2 E_{dc}\left(\frac{\pi}{2} - y\right) \quad (4)$$

Substituting for A and B in Equation 2 their respective values from Equations 3 and 4 and solving for $E_{dc}$ one obtains:

$$E_{dc} = \frac{E (\cos y + 1)}{(\pi - y)} \quad (5)$$

But from Fig. 2 it is observed that at $y$, $$E_{dc} = E \sin y \quad (6)$$

Therefore substituting for $E_{dc}$ in Equation 5 from Equation 6 one obtains, $$\sin y = \frac{(\cos y + 1)}{(\pi - y)} \quad (7)$$

and solving Equation 7 for $y$ $$y = .72 \text{ radians or } 46°$$

Thus from the above geometrical analysis and especially from Equation 6 it is found that the direct current voltage $E_{dc}$ should be, in the critical case represented by Fig. 2 where $A = B$, 72% of the amplitude $E$ or maximum value of the counter electromotive force $e$ and then the angle $y$ where the direct current voltage $E_{dc}$ first equals the alternating current voltage $E$ in Fig. 2 will be equal to 46°.

For proper operation of my new type of inverter it is also essential that there should be a specific relationship between the reactance of the direct current circuit, which is assumed to be all embodied in inductance 12, and the current and voltage of the direct current circuit. This relationship is explained by the equation, $$e_L = L \frac{di}{dt} \quad (8)$$

or $$i_{max} = \frac{1}{L} \int_{\omega t = 0}^{\omega t = 46°} e_L \, dt \quad (8a)$$

where L is the inductance in henrys of coil 12, $i$ is the current flowing through electric discharge valve 13, and $e_L$ is the instantaneous voltage across inductance 12 and is represented by the following equation:

$$e_L = E_{dc} - e \quad (9)$$

or $$e_L = .72E - E \sin \omega t \quad (9a)$$

Substituting the value of $e_L$ given by Equation 9a into Equation 8a and solving the integral one obtains, $$i_{max} = \frac{.27E}{\omega L} \quad (10)$$

But $$\omega L = X \quad (11)$$

where X equals the reactance of inductance 12 in ohms. Hence substituting for L from Equation 11 and setting up Equation 10 in terms of $E_{dc}$ one obtains:

$$i_{max} = \frac{.37 E_{dc}}{X} \quad (12)$$

Equation 12, therefore, shows that in order that the current $i$ shown in Fig. 2, which flows through electric discharge valve 13 becomes zero exactly at the point represented by the angle $z$, a definite relationship between the values of the reactance X, the direct current voltage $E_{dc}$ and the peak current value $i_{max}$ flowing through the electric discharge valve must obtain. It will be understood, of course, that if the counter electromotive force $e$ of the inverter has a somewhat greater maximum value or amplitude $E$ than $$\frac{E_{dc}}{.72}$$

the area B will be larger than the area A and the current $i$ flowing through discharge valve 13 will be extinguished prior to the point represented by the angle $z$ which is still within the range of satisfactory operation, since all that is necessary is for area A to be equal to or less than area B.

In the arrangement disclosed in Fig. 1 electric discharge valve 13 acts as a valve admitting current to flow through the primary winding 18 of transformer 17 during every other half cycle of the voltage of load circuit 11. In practice it is better to pass current through this transformer winding during both positive and negative half cycles of the load circuit 11 and this may be done by the use of two electric discharge valves as illustrated in Fig. 3, wherein the operation of each valve is identical with that of Fig. 1 where a single electric discharge valve is employed. In other words, each of the electric discharge valves in Fig. 3 operates independently of what happens in the other discharge valve. In describing the arrangement disclosed in Fig. 3 the same reference numerals will be used to characterize parts corresponding to those already referred to in Fig. 1.

In Fig. 3 energy from the direct current source 10 is transmitted to the alternating current circuit 11 having a source of counter electromotive force symbolically shown at 11' through two electric discharge valves 31 and 32 connected in the conventional parallel inverter type circuit in series with an inductance 12. An inductive winding 33 has its midpoint 34 connected to one side of the direct current source 10 while the end terminals thereof are connected to the cathodes 35 of electric discharge valves 31 and 32, respectively. These electric discharge valves are also provided with anodes 36 and control electrodes or grids 37. Inductively coupled with winding 33 is winding 38 connected to the alternating current load circuit 11. A capacitor 39 is connected across winding 38 for purposes which will be hereinafter pointed out. It will be noted that the arrangement disclosed in Fig. 3 is similar to that of the well known parallel inverter, although the functioning is entirely different. This difference in functioning depends upon the relative values of the electromotive force of the direct and alternating current circuits and the reactance of inductance 12 connected in the direct current circuit. As shown in Fig. 4 the inverter illustrated in Fig. 3 has the same operating characteristics as the inverter illustrated in Fig. 1, except that the electric discharge valve conducts current every half cycle rather than every other half cycle. The counter electromotive force against which electric valves 31 and 32 must operate is represented respectively by $e_{31}$ and $e_{32}$ in Fig. 4. It will be obvious to those skilled in the art that a suitable grid control circuit, for example, one similar to that illustrated in Fig. 1 may be provided for control electrodes 37 of electric discharge valves 31 and 32 illustrated in Fig. 3. Since I have provided capacitor 39 connected across the load circuit 11, which is capable of providing a commutating potential for the apparatus illustrated in Fig. 3, it is possible to take advantage of the fact that this inverter can at the same time operate according to the new principle which I have just described and also like the well known type of parallel inverter. If the reactance of inductance 12 is so adjusted relative to the other factors that the current through the valves 31 and 32 is extinguished shortly before commutation is to take place, then the possibility that the apparatus may operate like the parallel inverter depending upon some commutating means as for example capacitor 39, gives a double assurance that the current transfer from one electric valve to the other is going to take place. If the arc has been extinguished in electric discharge valve 31 then the commutation simply consists of starting the arc in electric discharge valve 32 at the proper interval. However, if the extinguishment has not been complete and there is a residual current which is increasing as when, for example, area B is smaller than area A in Figs. 2 and 4, the commutation will force this current into the other electric discharge valve. Hence, in the arrangement disclosed in Fig. 3 it is possible to operate the apparatus in the most ideal way with the current wave tangent to the zero line at the time the current is to be extinguished in one electric discharge valve and then be able to depend upon commutation in case such extinguishment should not be completed. The current and voltage diagrams of Fig. 4 show that the wave of the current $i$ flowing through the electric discharge valves 31 and 32 between firing and extinguishment lasts about one-third of a cycle of the output frequency. It is thus apparent that in the operation of the single phase inverter shown in Fig. 3 there is an appreciable interval between the extinguishing of the current $i$ of one-half cycle and the initiation of this current during the next half cycle.

By utilizing a three-phase inverter embodying the extinction features of my new type inverter as illustrated in Fig. 5 it is possible to obtain the initiation of current in one phase practically simultaneously with the extinguishment of current in another phase, thus making for a more efficient arrangement. Furthermore, since initiation and extinguishment of the current are almost simultaneous, commutation will take place at the moment when extinguishment is complete under the most ideal conditions and will assist in the transfer of current if the extinguishment is not complete.

Thus in Fig. 5 I have illustrated an arrangement wherein energy is transmitted from direct current source 40 to a three-phase alternating current load circuit 41 through inductance 42 and electric discharge valves 43, 44 and 45 each provided with an anode 46, a cathode 47, and a control electrode 48. Windings 49, 50 and 51 each connected in series with one of the electric discharge valves 43, 44 and 45 are connected in Y relation with the neutral point of the Y connected to one side of the direct current circuit 40. For transmitting energy to the load circuit 41 I provide Y connected winding 52 inductively related with windings 49, 50 and 51. The operation of the inverter illustrated in Fig. 5 may be understood by reference to Fig. 6 where the counter electromotive forces against which each of the electric discharge valves 43, 44 and 45 must operate, are represented by $e_{43}$, $e_{44}$ and $e_{45}$, respectively. The pulsating current $i$ drawn from the power source touches the zero line three times in a cycle of the output current. It is, however, desirable that the current transmitted from direct current source 10 be constant and not pulsating, and this result can be obtained by using two three-phase inverters of the type illustrated in Fig. 5 operating in parallel and displaced in phase so that the triple harmonic current that each tends to draw from the line is neutralized by the other. This triple harmonic current will thus circulate between the two sets of three-phase inverters while the line current is practically constant.

Accordingly, in Fig. 7 I have shown two three-phase inverters of the type illustrated in Fig. 5 operating in parallel. Energy is transmitted from the direct current source 53 to the three-phase alternating current load circuit 54 through a plurality of electric discharge valves 55, 56, 57, 58, 59, 60, inductances 61 and 62 and transformer 67. As illustrated by Equation 12 the reactance of inductances 61 and 62 must bear a definite relationship to the direct current voltage and the maximum current flowing through the electric discharge valves. It will be understood, therefore, that the reactances of inductances 61 and 62 will have to change with varying loads in order that this condition may be obtained. However, any well known means may be employed for varying the reactances of inductances 61 and 62 in accordance with the change in load but I have illustrated inductances 61 and 62 as of the type which are variable by saturation. Each of these inductances includes two magnetic cores 63 and 64 provided with saturating windings 65 and 66 which are connected relatively in opposition so that the reactive voltage is not induced in the saturating windings. Thus inductances 61 and 62 have the characteristic that their reactances are inversely proportional to the saturating current and since the line current is used as a saturating current the reactance of inductances 61 and 62 tends to vary with the load in such a manner as to enable the current to be extinguished regardless of the load without any commutation means, in accordance with the principles described in connection with Figs. 1 and 2. It will, of course, be understood by those skilled in the art that an inductance having a variable reactance with load may be employed in connection with the apparatus illustrated in Figs. 1, 3, and 5.

In order to obtain a better wave shape and greater utilization of the windings I have illustrated in Fig. 8 an inverter embodying my invention and operating as a six-phase full wave inverter wherein twelve electric discharge valves are utilized. Energy is transferred from the direct current source 70 to the three-phase alternating current load circuit 71 by means of a plurality of electric discharge valves 72 arranged in two full wave inverter circuits which are operated in parallel. Inductances 73 and 73a are connected in series with one of the full wave inverters and inductances 74 and 74a are connected in series with the other full wave inverter. It will be understood, of course, that these inductances have a definite value of reactance relative to the remaining factors cooperating to extinguish the current through the valves so that the operation of the apparatus will be in accordance with the principles set forth in connection with Fig. 1. Inductive windings 75 and 76 are associated with each of the full wave inverters operating in parallel and are inductively coupled to three-phase winding 77 connected in the load circuit 71. Windings 75 and 76 are Y-connected and have their neutral points interconnected by line 78. The operation of the arrangement illustrated in Fig. 8 will be well understood in view of the detailed description set forth in connection with the apparatus illustrated in Figs. 1, 3, 5 and 7. It will, of course, be understood that inductances 73, 73a, 74, 74a, may be arranged to vary with load so that the current through the electric discharge valves will be extinguished at any load without any forcing commutation means. However, if it should be desired to operate the apparatus illustrated in Fig. 8 both in accordance with the principles set forth in my new type of inverter and also to take advantage of the commutation means to insure that the current through the electric discharge valves will be transferred at the proper times, a leading power factor may be produced in the load circuit 71 by means of a synchronous condenser (not shown) as is well understood by those skilled in the art. If it should be desirable to avoid the use of rotating machinery to supply the leading power factor, I have shown in Fig. 9 the identical arrangement illustrated in Fig. 8, except that I have provided a harmonic commutation scheme utilizing interphase transformers 79 and capacitors 80 to produce the leading kva. for commutation purposes. This latter arrangement will be well understood by those skilled in the art and is described and claimed in U. S. Reissue Patent No. 20,391, issued June 1, 1937.

While I have shown and described my invention in connection with certain specific embodiments, it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States, is:

1. The combination of a direct current supply circuit, an alternating current load circuit, an electric discharge valve interconnecting said supply circuit and said load circuit, and inductive means having such a value of reactance relative to the electromotive forces of both said load and supply circuits that the resultant of said electromotive forces and the magnitude of said inductive means is effective to periodically reduce the current flow through said discharge valve to zero.

2. The combination of a source of direct current, an alternating current load circuit, an electric discharge valve interconnecting said source and said load circuit, and inductive means in said direct current circuit having a definite value of reactance relative to the voltages of said source and said load circuit so that a periodic current flows through said discharge valve which current is forced to zero when said valve is to become nonconductive, by the resultant of the electromotive forces of said source and load circuit, said periodic current having a wave form which is substantially tangent to the zero line just prior to the time said valve becomes nonconductive.

3. In an electric valve inverter, a direct current source, an alternating current load circuit, a single electric discharge valve interconnecting said source and said load circuit, and inductive means in said direct current circuit having a definite value of reactance relative to the voltages of said source and said alternating current load circuit so that the current flowing through said discharge valve rises to a maximum value when said direct current voltage is equal to the instantaneous value of the counter electromotive force of said inverter and thereafter is forced down to zero by the time the instantaneous value of said counter electromotive force has again decreased to a value equal to the direct current voltage.

4. In combination a direct current source, an alternating current load circuit, a plurality of electric discharge valves interconnecting said source and said load circuit, and inductive means in said direct current circuit having a definite value of reactance relative to the voltages of said source and said alternating current load circuit so that the currents flowing through said electric discharge valves are periodically decreased to zero, and means for forcibly transferring the current from one of said plurality of electric discharge valves to the other if the current through one of said electric discharge valves should not have decreased to zero when communication is to take place.

5. The combination of a direct current supply circuit, an alternating current load circuit, a plurality of electric discharge valves interconnecting said supply circuit and said load circuit, inductive means having such a value of reactance relative to the current and voltage of said direct current circuit that the current flowing through said electric discharge valves is periodically decreased to zero, and auxiliary means for forcibly extinguishing the current if it has not decreased to zero within the proper time.

6. The combination of a direct current supply circuit, an alternating current load circuit, an electric discharge valve interconnecting said supply circuit and said load circuit, and inductive means having a variable reactance of such a value at all times relative to the current and voltage of said direct current circuit as to reduce periodically the current flowing through said electric discharge valve to zero.

7. The combination of a direct current circuit for supplying a direct current voltage, an alternating current load circuit having a source of counter electromotive force, an electric discharge valve interconnecting said direct current circuit and said load circuit, and inductive means in said direct current circuit having a value of reactance such that the energy stored therein during the interval when said counter electromotive force is less than said direct current voltage is substantially equal to the energy released thereby during the interval when said counter electromotive force is greater than said direct current voltage.

8. The combination of a direct current supply circuit, an alternating current load circuit, an electric discharge valve interconnecting said supply circuit and said load circuit, inductive means having at every instant such a value of reactance relative to the current and voltage of said direct current circuit that the current flowing through said electric discharge valve is periodically decreased to zero, and means for varying the reactance of said inductive means inversely with respect to the current flowing through said electric discharge valve.

9. In combination, a direct current supply circuit, an alternating current load circuit, an electric discharge valve interconnecting said supply circuit and said load circuit, and inductive means having a reactance variable by saturation and of such a value at every instant relative to the value of the current and voltage of said supply circuit that the current flowing through said electric discharge valve is periodically decreased to zero.

10. In combination, a direct current supply circuit, a polyphase alternating current load circuit, a plurality of electric discharge valves interconnecting said supply circuit and said load circuit, inductive means having a variable reactance and of such a value relative to the values of the current and voltage of said supply circuit that the currents flowing through said electric discharge valves are periodically decreased to zero, and auxiliary means for forcibly transferring the current from one of said electric discharge valves to another if the current through said electric discharge valves has not decreased to zero within the proper time.

11. In an electric valve inverter, a direct current supply circuit, an alternating current load circuit, an electric discharge valve interconnecting said supply and load circuits, and inductive means in said direct current circuit having a variable reactance of such a value relative to the instantaneous values of the voltage and current of said supply circuit that the current flowing through said discharge valve rises to a maximum value when the voltage of said supply circuit is equal to the counter electromotive force of said inverter and thereafter is forced down to zero by the time said counter electromotive force has again decreased to a value equal to the voltage of said supply circuit.

ERNST F. W. ALEXANDERSON.

CERTIFICATE OF CORRECTION.

Patent No. 2,225,328. December 17, 1940.

ERNST F. W. ALEXANDERSON.

It is hereby certified that error appears in the printed specification of the above numbered patent requiring correction as follows: Page 6, first column, line 18, claim 4, for the word "communication" read --commutation--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.